United States Patent
Wallin et al.

(10) Patent No.: US 11,721,935 B2
(45) Date of Patent: Aug. 8, 2023

(54) ELECTRICAL CONNECTOR SUPPORT RING

(71) Applicant: Hamilton Sundstrand Corporation, Charlotte, NC (US)

(72) Inventors: Evan Wallin, Freeport, IL (US); Jessica M. Friedberg, Stillman Valley, IL (US); Michael J. DeVito, Loves Park, IL (US); Calvin Eads, Lafayette, IN (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 329 days.

(21) Appl. No.: 17/011,294

(22) Filed: Sep. 3, 2020

(65) Prior Publication Data

US 2023/0208074 A1    Jun. 29, 2023

(51) Int. Cl.
 *H01R 13/52* (2006.01)
(52) U.S. Cl.
 CPC ..... *H01R 13/5219* (2013.01); *H01R 13/5202* (2013.01)
(58) Field of Classification Search
 CPC .... H01R 13/00; H01R 13/52; H01R 13/5202; H01R 13/5219; H01R 13/5221
 USPC ........................................................ 277/584
 See application file for complete search history.

(56) References Cited

U.S. PATENT DOCUMENTS

| | | | | |
|---|---|---|---|---|
| 4,712,846 A | * | 12/1987 | Bardsley | H01R 13/64 439/294 |
| 9,885,434 B2 | | 2/2018 | Irwin et al. | |
| 2001/0027043 A1 | * | 10/2001 | Shiraki | H01R 13/7032 439/507 |
| 2019/0379154 A1 | * | 12/2019 | Nishijima | H01R 13/40 |

FOREIGN PATENT DOCUMENTS

| | | | |
|---|---|---|---|
| JP | 2014112484 A | * | 6/2014 |
| JP | 2014112484 A | | 6/2014 |
| JP | 2020057555 A | | 4/2020 |

OTHER PUBLICATIONS

Extended European Search Report for Application No. 21194626.4 dated Jan. 31, 2022.

* cited by examiner

*Primary Examiner* — Nathan Cumar
(74) *Attorney, Agent, or Firm* — Cantor Colburn LLP

(57) ABSTRACT

Provided are embodiments for an electrical connector system. Embodiments include an electrical connector and a support ring where the support ring includes a baseplate having a first side and a second side, a recessed portion on a first side of a baseplate for a primary O-ring, and a sidewall extending from the second base plate. Embodiments also include a housing coupled to the support ring, wherein the sidewall extends into the housing, wherein the support ring is coupled to the electrical connector on the first side, and the support ring is coupled to the housing on the second side. Also provided are embodiments for the support ring and assembling the electrical connector system.

9 Claims, 3 Drawing Sheets

ELECTRICAL CONNECTOR SUPPORT RING

STATEMENT OF FEDERAL SUPPORT

This invention was made with Government support under contract FA8611-08-C-2897/CY2016-2017 awarded by the United States Air Force/DOD. The Government has certain rights in the invention.

BACKGROUND

The present invention relates generally to electrical connector hardware components. More particularly, the present invention relates to an electrical connector support ring for mating an electrical connector to a housing.

In today's environment, cables and cable connectors are ubiquitous to our technical environment. Equipment requiring electricity can be powered either by an internal power source such as a battery or an external power source. In the event the equipment is supplied power and/or communicates with an external source a cable can be used. A cable such as a wiring harness can be used to carry power and data signals to and from the equipment.

A myriad of connectors is used to couple cables and other signal carrying lines. The cables can carry multiple signals on multiple lines, and can be made of numerous materials, including copper wire, fiber-optics, gold-plated materials, etc. Furthermore, the signal lines carrying the signal through the cables can have a number of arrangements, where lines can be bundled or unbundled, multiplexed or non-multiplexed, and can carry a near limitless range of signals, carrying electrical pulses and currents which transmit data, encoded or un-encoded, voice communications, audio and video communications, etc.

BRIEF DESCRIPTION

According to an embodiment, a support ring is provided. The support ring includes a baseplate having a first side and a second side; a recess portion on a first side of a baseplate for a primary O-ring; and a sidewall extending from the second baseplate.

In addition to one or more of the features described herein, or as an alternative, further embodiments include a support ring that is composed of an anti-corrosive material.

In addition to one or more of the features described herein, or as an alternative, further embodiments include a sidewall of the support ring that forms an inner diameter defining an inner cavity of the support ring.

In addition to one or more of the features described herein, or as an alternative, further embodiments include a sidewall of the support ring that is inserted into a housing and prevents the primary O-ring from entering the inner cavity of the support ring.

In addition to one or more of the features described herein, or as an alternative, further embodiments include a sidewall of the support ring that is configured to support a secondary O-ring positioned on an outer diameter of the support ring.

In addition to one or more of the features described herein, or as an alternative, further embodiments include dimensions of the sidewall that extend beyond the secondary O-ring positioned on the outer diameter of the support ring.

In addition to one or more of the features described herein, or as an alternative, further embodiments include a baseplate that includes a thickness dimension that determines a strength of a connection of an electrical connecter coupled to the support ring.

Also disclosed is an electrical connector system in accordance with one or more embodiments. The system includes an electrical connector; a support ring coupled to the electrical connector; a baseplate having a first side and a second side; a recessed portion on a first side of a baseplate for a primary O-ring; and a sidewall extending from the second base plate; and a housing coupled to the support ring, wherein the sidewall extends into the housing, wherein the support ring is coupled to the electrical connector on the first side, and the support ring is coupled to the housing on the second side.

In addition to one or more of the features described herein, or as an alternative, further embodiments include a primary gasket arranged between the support ring and the electrical connecter, and a secondary gasket arranged between the support ring and the housing.

In addition to one or more of the features described herein, or as an alternative, further embodiments include a secondary O-ring, wherein the second O-ring is positioned on the base plate and the primary O-ring is positioned within the recessed portion of the base plate.

In addition to one or more of the features described herein, or as an alternative, further embodiments include a support ring that is composed of an anti-corrosive material.

In addition to one or more of the features described herein, or as an alternative, further embodiments include a sidewall of the support ring that forms an inner diameter defining an inner cavity of the support ring.

In addition to one or more of the features described herein, or as an alternative, further embodiments include a sidewall of the support ring that is inserted into a housing and prevents the primary O-ring from entering the inner cavity of the support ring.

In addition to one or more of the features described herein, or as an alternative, further embodiments include a sidewall of the support ring that is configured to support a secondary O-ring positioned on an outer diameter of the support ring.

In addition to one or more of the features described herein, or as an alternative, further embodiments include dimensions of the sidewall that extend beyond the secondary O-ring positioned on the outer diameter of the support ring.

In addition to one or more of the features described herein, or as an alternative, further embodiments include a baseplate that includes a thickness dimension that determines a strength of a connection of an electrical connecter coupled to the support ring.

Also disclosed is a method for assembling an electrical connector system in accordance with one or more embodiments. The method includes inserting a support ring into a housing, wherein the support ring comprises: a baseplate having a first side and a second side; a recessed portion on a first side of a baseplate for a primary O-ring; and a sidewall extending from the second side of the baseplate, wherein the sidewall of the support ring extends into the housing.

In addition to one or more of the features described herein, or as an alternative, further embodiments include inserting the primary O-ring into the recessed portion of the support ring.

In addition to one or more of the features described herein, or as an alternative, further embodiments include inserting a secondary O-ring into the housing prior to inserting the support ring into the housing, wherein the sidewall of the support ring prevents the second O-ring from entering an inner diameter defined by the support ring.

In addition to one or more of the features described herein, or as an alternative, further embodiments include inserting a primary gasket between the support ring and the electrical connecter, and a secondary gasket between the support ring and the housing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Oil leakage can occur between an interface between a housing (generator housing) and an electrical connector. Conventional connectors do not offer a robust connection between the housing and the electrical connector. An O-ring may be used to help seal the interface. However, current designs allow the O-ring to move out of position and can cause a leak at the interface. In some instances, the connector that is coupled to the housing is used as a handle to transport the equipment which can add further stress to the interface and cause the material at the interface to deform causing a leak.

Accordingly, it is desirable to provide an apparatus, such as a support ring, for an electrical connector that is simple and robust, and can be easily fixed to new and existing electrical connectors. It is also desirable to provide a method of assembling and making such a support ring and electrical connector system.

The technical effects and benefits include providing a machined component used to provide axial squeeze on O-rings used to seal the interface between off-the-shelf electrical connectors and the corresponding housings. This component creates a double seal: one seal between the electrical connector and support ring, and a secondary seal between the support ring and the housing which increases the reliability of the system.

Figure 1:
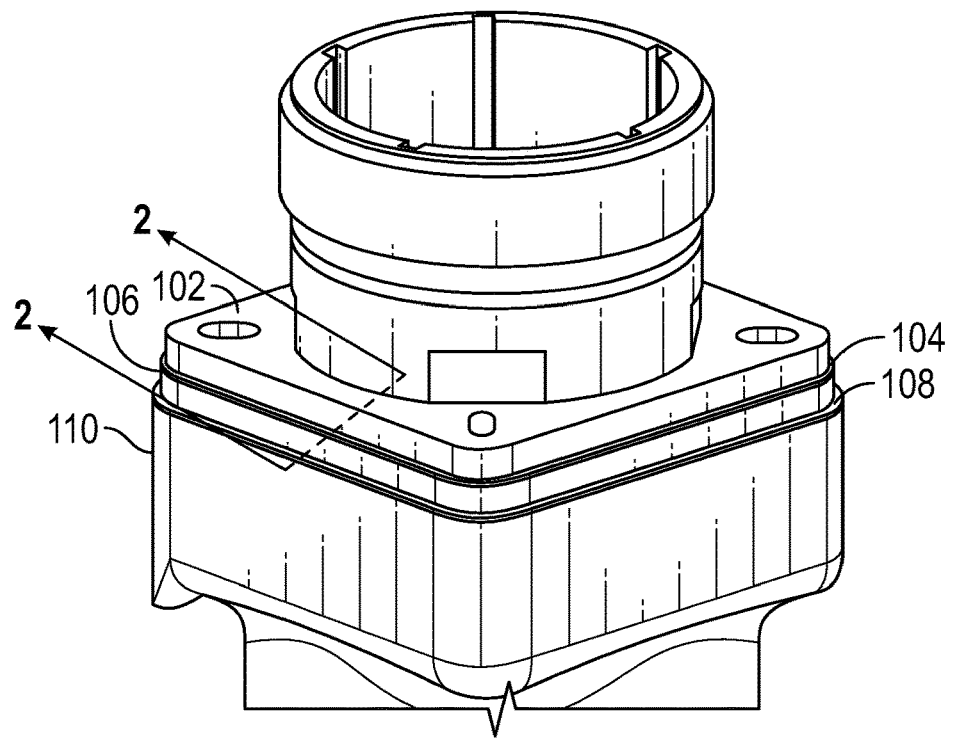
FIG. 1 is a perspective view illustrating an electrical connecter system in accordance with one or more embodiments.

FIG. 1 is a perspective view of an electrical connector system 100 including the support ring 106 in accordance with one or more embodiments. The electrical connector system 100 is made up of the electrical connector 102, the support ring 106, and the equipment housing 110.

In some embodiments, the electrical connector 102 can include an electrical wiring harness but is not limited thereto. The electrical components (not shown) may be provided through the hollow inner diameter 206 of the support ring 106.

A gasket 104 is positioned between the connector 102 and the support ring 106. The gasket 104 is a rubber or metallic material that is used seal a junction or interface between to surfaces. In a non-limiting example, the gasket 104 can be made of a metallic material that will mate to the electrical connector 102 and support ring 106 and form a bond.

The support ring 106 provides additional support for sealing components, such as O-rings (which are not shown). The baseplate 10 of the support ring 106 has a first side 10A and a second side 10B. The support ring 106 includes a sidewall 208 that extends from the second side 10B of the baseplate 10 of the support ring 106 into the housing 110. An outer diameter D1 of the sidewall 208 of the support ring 106 provides support for the secondary O-ring 204 (shown in FIG. 2) which prevents the O-ring from moving or spilling into the inner diameter of the support ring 106 and the housing 108.

The sidewall 208 of the support ring 106 changes the stress path in the event it is used as a handle to transport the equipment and offers further protection when compared to conventional solutions. The thickness of the baseplate of the support ring 106 can be modified during manufacturing to increase the strength of the connection between the electrical connector 102 and the support ring 106.

In one or more embodiments, the support ring 106 is made of the same material as the electrical connector 102. In a non-limiting example, the support ring 106 can be made of corrosion resistant steel. This can help prevent or reduce corrosive reactions that may occur at the interface between the support ring 106 and the electrical connector 102. It should be understood that any type of material can be used and is not limited by the material described herein.

In one or more embodiments, a second or secondary gasket 108 is positioned between the support ring 106 and the housing 110. This gasket can provide additional assistance in forming a reliable seal at the interface between the support ring 106 and the housing 110. The gaskets 104, 108 and the O-rings 202, 204 (shown in FIG. 2) can be formed of the same material which reduces complexity and parts of the electrical connector system 100. The housing 110 may be a for various types of equipment such as a generator. However, it should be understood the housing 110 can be part of other types of equipment and is not intended to be limited by the example described herein.

Figure 2:
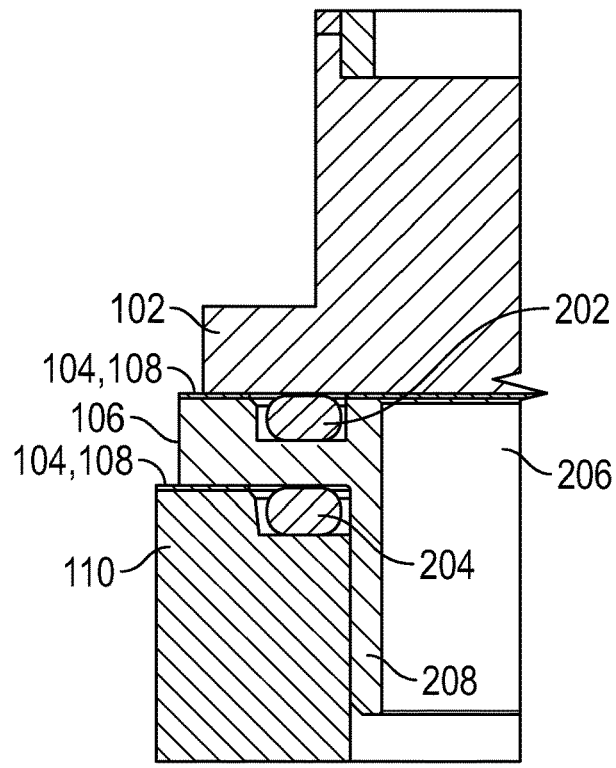
FIG. 2 is a cross-sectional view of the electrical connecter system along the line A-A line shown in FIG. 1 in accordance with one or more embodiments.

FIG. 2 is a cross-sectional view of the system 100 taken along the line A-A shown in FIG. 1. The cross-sectional view illustrates the internal components of the system 100 which includes a primary O-ring 202 and a secondary O-ring 204. The primary O-ring 202 is provided within a recessed portion of the support ring 106. The recessed portion allows the primary O-ring to be positioned within the baseplate of the support ring 106 and provides a reliable seal. The recessed portion ensures the primary O-ring 202 will not move out of position in the support ring.

The inner diameter 206 of the support ring 106 is defined by the sidewall 208 which extends into the housing 110. The secondary O-ring 204 is positioned below the baseplate of the support ring 106 adjacent to an outer portion of the sidewall 208. The secondary O-ring 204 also contacts the housing 110. The sidewall 208 of the support ring 106 prevents the secondary O-ring 204 from entering the inner diameter 208 of the support ring 106 during the lifetime and operation of the electrical connector system 100. In one or more embodiments, the secondary O-ring 204 is positioned in a recessed portion of the housing 110.

Figure 3A:
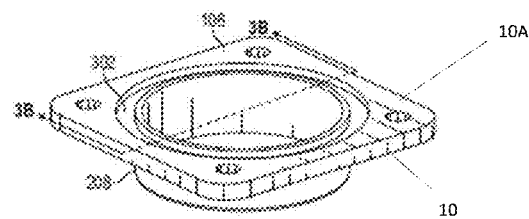
FIG. 3A is a perspective view of the support ring in accordance with one or more embodiments.
Figure 3B:
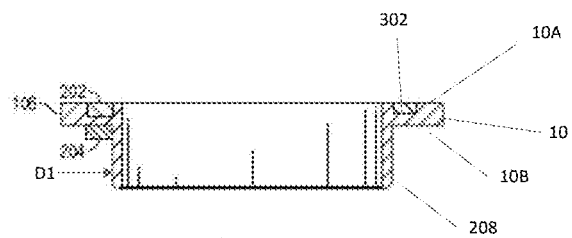
FIG. 3B is a cross-sectional view of the support ring taken along the line A-A of FIG. 3A in accordance with one or more embodiments.

FIG. 3A is a perspective view of the support ring 106. The baseplate 10 of the support ring 106 includes a plurality of openings so that a bolt, screw, or other type of fastener can be used to attach the support ring 106 to the electrical connector 102 and the housing 110. FIG. 3A also illustrates a recessed portion 302 in the first side 10A of the baseplate 10 of the support ring 106. FIG. 3B illustrate a cross-sectional view of the support ring 106 along the line A-A shown in FIG. 3A. FIG. 3B illustrates the double seal that is formed by the primary O-ring 202 and secondary O-ring 204. In addition, the inner sidewall and outer sidewall defining a thickness dimension of the sidewall 208 is shown.

Figure 4A:
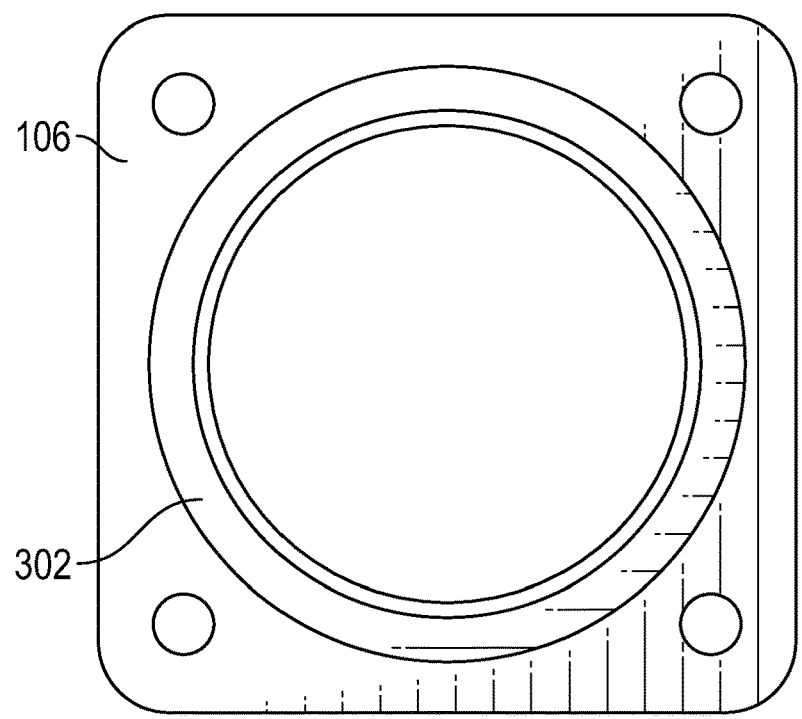
FIG. 4A is a top-down view of the support ring in accordance with one or more embodiments.
Figure 4B:
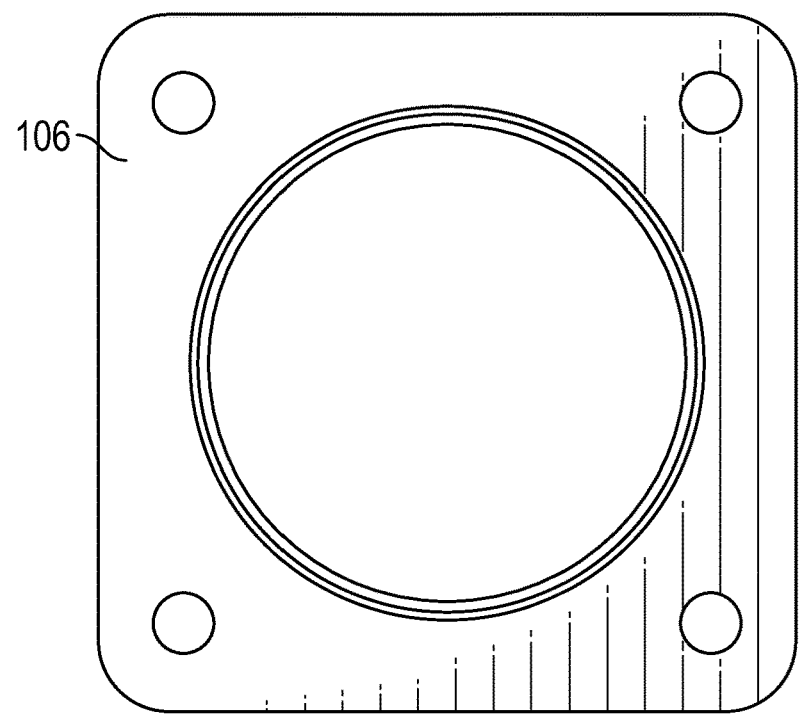
FIG. 4B depicts a bottom-up view of the support ring in accordance with one or more embodiments.

FIG. 4A illustrates a top-down view of the support ring 106 in accordance with one or more embodiments. The top-down view shows the recess for the primary O-ring 202 (shown in FIG. 2). It also shows a top surface of the baseplate where a first gasket, such as the gasket 104 can be applied. FIG. 4b depicts a bottom-up view of the support ring 106. The bottom-up view shows a bottom surface of the support ring where a second gasket, such as gasket 108 can be applied.

The technical effects and benefits provide a support ring that delivers sufficient leakage prevention at the interface between the housing and the off-the-shelf electrical connector at minimal cost. The support ring can be retrofitted to existing off-the-shelf electrical connectors.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An electrical connector system comprising:
   an electrical connector;
   a support ring coupled to the electrical connector;
   a baseplate of the support ring has a first side and a second side;
   a recessed portion of the support ring, on the first side of the baseplate, for a primary O-ring; and
   a sidewall of the support ring, extending from the second side of the base-plate; and
   a housing coupled to the support ring,
   wherein the sidewall extends into the housing,
   wherein the support ring is coupled to the electrical connector on the first side, and
   the support ring is coupled to the housing on the second side.

2. The system of claim 1, further comprising a primary gasket between the support ring and the electrical connecter, and a secondary gasket between the support ring and the housing.

3. The system of claim 1, further comprising a secondary O-ring, wherein the second O-ring is positioned on the base plate and the primary O-ring is positioned within the recessed portion of the base plate.

4. The system of claim 1, wherein the support ring is composed of an anti-corrosive material.

5. The system of claim 1, wherein the sidewall of the support ring forms an inner diameter defining an inner cavity of the support ring.

6. The system of claim 5, wherein the sidewall of the support ring is inserted into a housing and prevents the primary O-ring from entering the inner cavity of the support ring.

7. The system of claim 1, wherein the sidewall of the support ring is configured to support a secondary O-ring positioned on an outer diameter of the sidewall of the support ring.

8. The system of claim 7, wherein sidewall dimensions of the sidewall extend beyond the secondary O-ring positioned on the outer diameter of the sidewall of the support ring.

9. A method for assembling an electrical connector system, comprising:
   inserting a support ring into a housing, wherein the support ring comprises:
   a baseplate having a first side and a second side;
   a recessed portion on the first side of the baseplate for a primary O-ring; and
   a sidewall extending from the second side of the baseplate, wherein the sidewall of the support ring extends into the housing; and
   inserting a primary gasket between the support ring and the electrical connecter, and a secondary gasket between the support ring and the housing.

* * * * *